No. 651,909. Patented June 19, 1900.
H. O. WHITE.
ELECTRIC MOTOR.
(Application filed Oct. 18, 1899.)
(No Model.) 2 Sheets—Sheet 1.
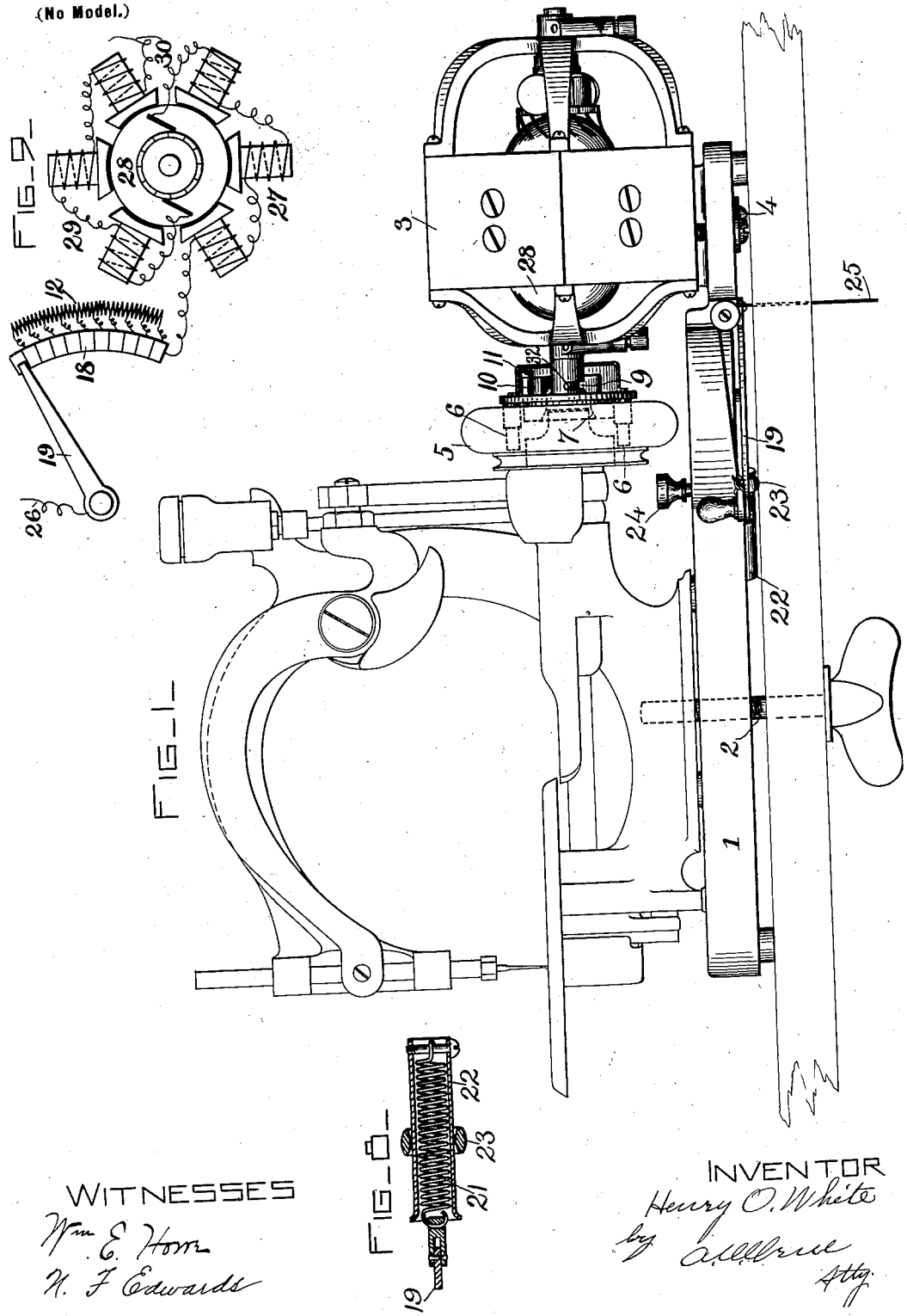
WITNESSES
Wm. E. Horn
N. F. Edwards
INVENTOR
Henry O. White
by A. L. Mull
Atty.

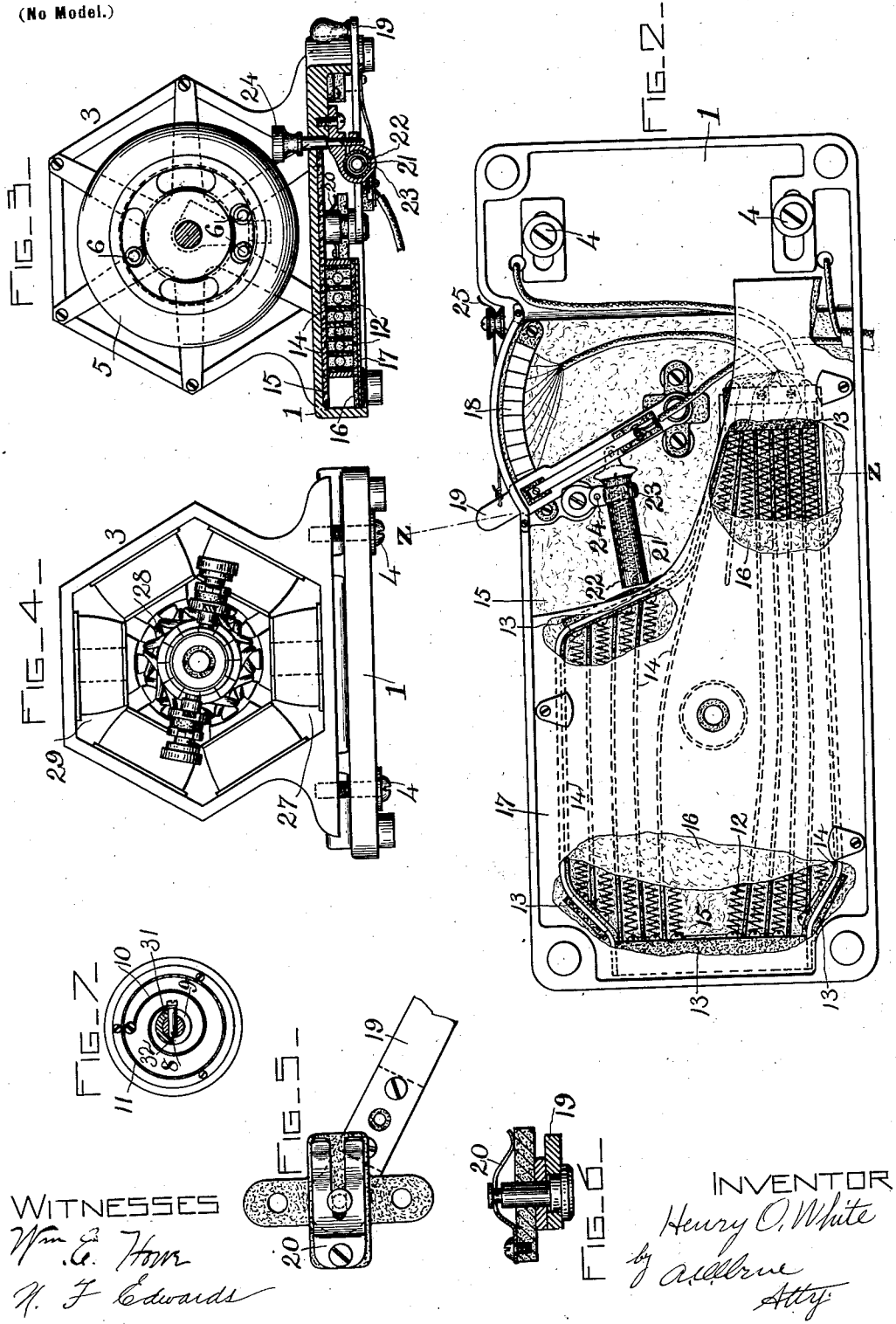

UNITED STATES PATENT OFFICE.

HENRY O. WHITE, OF BOSTON, MASSACHUSETTS.

ELECTRIC MOTOR.

SPECIFICATION forming part of Letters Patent No. 651,909, dated June 19, 1900.

Application filed October 18, 1899. Serial No. 734,016. (No model.)

*To all whom it may concern:*

Be it known that I, HENRY O. WHITE, of Boston, in the county of Suffolk and State of Massachusetts, have invented certain new and useful Improvements in Electric Motors, of which the following is a specification.

This invention relates to electric motors; and it consists in devices for adapting such motors to driving isolated mechanism, and for convenience of illustration a sewing-machine is selected.

The market is now supplied with electric motors intended to drive a machine with a belt; but such an arrangement is cumbersome and unsatisfactory. Another device replaces the balance-wheel of the machine with one member of an electric motor; but this arrangement is less efficient than the first.

Knowing the calls of the trade I have endeavored to produce a device which without being unwieldy, on the one hand, or ineffectual, on the other, is self-contained, furnishes a support, and is able to start and control the speed of the machine under the usual conditions of use. To this end I furnish a base, to which the driven machine may be fastened by a screw and at one extremity of which is adjustably secured an electric motor. The shaft of the electric motor carries a bell-center to aline the motor with the driven machine, and a pronged clutch engages the balance-wheel to furnish a driving connection with the motor. The base contains a resistance to regulate the speed of the motor and a controlling-switch for the resistance, the blade of which may be, if desired, placed in any position and retained by a frictional device, or the blade is put under the control of a spring which tends to move the blade to the "off" position, the required speed being obtained by moving the blade against the spring by the fingers or through a cord attached to a treadle.

In some kinds of work it is useful to have the machine warm, and some of the speeds of the motor or additional resistance in the base can be utilized for this purpose. On the other hand, if desired, the heat may be dissipated by suitable ventilation.

Labor-saving mechanism, as a sewing-machine, starts with some difficulty because of the number of abrupt cams, eccentrics, and springs which retard the machine as it stops and usually leave it in the worst position for further motion. This has been an obstacle to the use of electric appliances, as there is danger of burning out the coils of a still motor heavily loaded if the current is applied suddenly. Without using a much larger motor than required when in motion I have found it useful to loosely connect my motor to the clutch and fasten a spring to the clutch and motor-shaft, so that when the driven machine stops the spring will turn back the armature of the motor about one hundred and eighty degrees. The spring may be so proportioned that when the armature revolves a slight jar is given the clutch, as a pin in the armature-shaft comes in driving contact with the termination of a slot in the clutch-sleeve, thus setting the machine in motion.

The motor may be wound for either direct or alternating currents. The illustration shows my winding for direct currents. I produce a bipolar field by connecting consecutive poles each having a winding, in one sense, and others having a winding in a reverse sense. The toothed armature is supplied with a Gramme winding and connected between the members of the field of opposite polarity.

The base and attached motor contain all that is required to drive and control a machine and in this form constitute an article of commerce, requiring of the purchaser no skilled labor to set up where used, as the device is adjusted in the factory for each special machine.

In the drawings, Figure 1 is an elevation of my electric motor in driving relation to a sewing-machine. Fig. 2 is an inverted plan of the base. Fig. 3 is a cross-section of the base on line Z Z and also showing the clutching devices. Fig. 4 is an end elevation of the motor without the spider. Figs. 5 and 6 show details of the switch-friction. Fig. 7 shows details of clutch and armature connection. Fig. 8 is a detail of the clamp and switch-spring. Fig. 9 is a diagram of circuits for direct-current motor.

The hollow casting 1 constitutes a bed for the driven machine, and the machine is fastened thereto by a thumb-screw 2 inserted from beneath the table. At the extremity of the bed an electric motor 3 is secured, the axial position of which may be adjusted by screws 4 passing through slots in the bed. The balance-wheel 5 of the machine receives between its spokes the prongs 6 of a clutch connected to the motor. This clutch carries a bell-center 7, adapted to receive the hub of the balance-wheel, thus insuring the adjustment of the machine and motor in line. The clutch is loose on the motor-shaft, but secured from displacement by a pin 8, fast in the shaft, which forms a driving member for the same, and the pin is limited in relative rotation by a slot 9 in the sleeve of the clutch. A coil-spring 10 is fastened to the clutch-disk and screwed to the pin 8 of the motor-shaft in such manner that when the machine stops the stress of the spring will cause the armature to turn back about half a revolution until the pin 8 touches the limiting-stop 31 at one extremity of the slot 9, thus providing play, so that the pin 8 may, when the armature is energized, strike the clutch-sleeve at the extremity 32 of the slot 9, which forms the complemental driving member, with sufficient force to start the machine. A sheet-metal cap 11 covers the parts.

A resistance 12 for the motor is secured to blocks of fiber 13, fastened to a metal frame, the inner faces of which and the convolutions of the resistance are insulated with asbestos paper 14. A sheet of asbestos 15 covers the bed-casting, against which the resistance is placed, and is covered with another sheet of asbestos 16, all of which is inclosed by a piece of thin metal 17 and secured in place by washers and screws. Leads from points of the resistance run to contacts 18, which may be traversed by a brush insulated and spring-supported upon the blade 19, which is frictionally restrained by the spring-clip 20 in contact with its center.

It is often desirable to cause the blade, notwithstanding the friction of the spring-clip 20, to return to the position including all the resistance and breaking the circuit of the motor, from which position it can only be intentionally moved by the operator. For this purpose I pivot the blade to the shackle of a spring 21, having its extremity fastened to a tube 22, which tube incloses the spring and slides through or is restrained by a clamp 23, attached to the under side of the bed. The clamp is opened or closed by the thumb-screw 24. To allow the operator the use of both hands, the blade may be controlled by a cord 25, attached to a treadle. If the operator wishes to have the spring 21 control the blade, the thumb-screw 23 is tightened; but if it is intended to have the clip 20 control the position of the blade the screw 23 is loosened.

The circuit of the motor is readily understood by the diagram, in which the line may be connected at 26, thence through the resistance 12 and lower field-coils 27, the armature 28, and the upper field-coils 29 to line at 30. This circuit gives a powerful starting torque; but the field is so strong that the rotation will not be excessive. The commutators of small motors are usually soon destroyed by sparking. There is little sparking with this winding, and the motors are hence durable.

Having described my invention and means for carrying it into effect, I claim and desire to secure by Letters Patent of the United States—

1. In an electric driving mechanism, a bed and means for securing the machine thereto, an electric motor axially adjustable on the bed, combined with devices to clutch and aline the machine and motor, substantially as described.

2. In an electric motor, a frictionally-restrained controller-blade, a retracting-spring attached to the blade and having a sliding connection with a clamp, combined with means to lock or release the clamp and sliding connection, substantially as described.

3. In an electric driving mechanism, a motor-shaft having a driving member, a driven shaft having a complemental driving member and a limiting-stop, combined with means for positioning the driving member of the motor-shaft in contact with the limiting-stop when at rest, so that, when the motor is energized, its driving member may strike, with a jar or slight shock, the complemental member of the driven shaft, substantially as described.

4. In an electric motor, a controller-blade having frictional devices adapted to normally locate it in any position, combined with a retracting device, having means to connect or disconnect it at will, that tends to restore it to the off position, substantially as described.

5. In an electric driving mechanism, a base having an electric motor at its extremity and adapted to support a driven machine in contact with the base, combined with means for warming the machine with the waste energy of the motor-controller, substantially as described.

In testimony whereof I have affixed my signature in presence of two witnesses.

HENRY O. WHITE.

Witnesses:
J. E. WHITNEY,
J. L. ADAMS.